F. W. THOMAS AND M. D. KIMBALL.
VACUUM OILING SYSTEM.
APPLICATION FILED APR. 23, 1921.
1,421,858. Patented July 4, 1922.
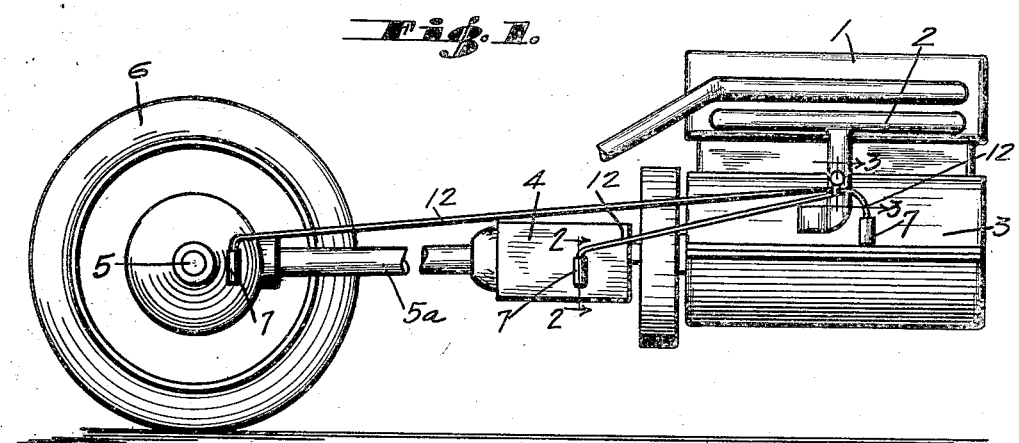
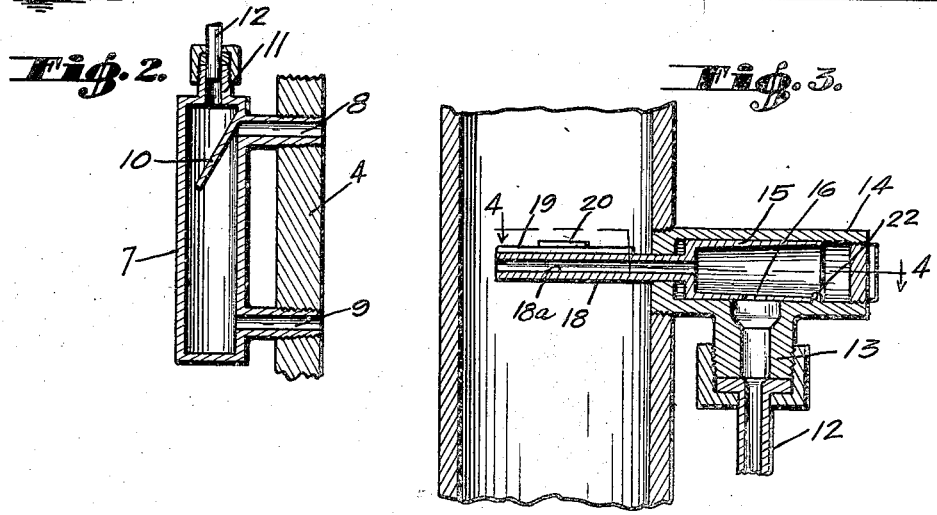
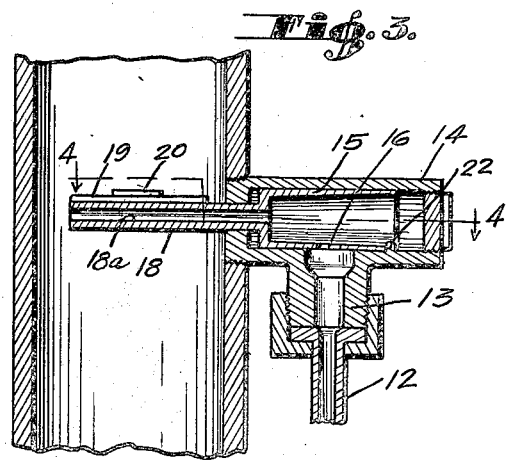
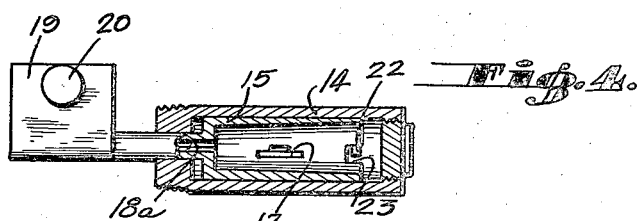
FRANK W. THOMAS
MAYO D. KIMBALL
INVENTORS.
BY
Hazard & Miller
ATTORNEYS.

UNITED STATES PATENT OFFICE.

FRANK W. THOMAS AND MAYO D. KIMBALL, OF PASADENA, CALIFORNIA.

VACUUM OILING SYSTEM.

1,421,858.   Specification of Letters Patent.   Patented July 4, 1922.

Application filed April 23, 1921. Serial No. 463,789.

*To all whom it may concern:*

Be it known that we, FRANK W. THOMAS and MAYO D. KIMBALL, citizens of the United States, residing at Pasadena, in the county of Los Angeles and State of California, have invented new and useful Improvements in Vacuum Oiling Systems, of which the following is a specification.

This invention is a device to be employed in connection with the lubricating system of an automobile or other machine and arranged by means of a suction to create a vacuum at the various reservoirs provided for the lubricant to be supplied to lubricating points. When a vacuum is thus created at the reservoirs for the lubricant, possibility of leakage from the reservoirs is eliminated, since the atmospheric pressure will exceed the pressure within the reservoirs and will thereby resist any tendency of the lubricant to escape from its reservoirs.

The device is particularly adapted for use in connection with the lubricating system of an automobile, and when employed in this connection the desired suction for forming vacuums at the reservoirs for the lubricant, is preferably created by the suction through the intake manifold of the automobile engine. The desired vacuum may be created at any of the various reservoirs for lubricating oil and particularly at the crank case of the engine, the transmission case, and the rear axle housing.

The improved apparatus includes valvular means in conjunction with the conduit leading from the intake manifold to the various points where a vacuum is to be created, said valvular means being automatic in its action and depending upon the variations in the suction through the intake manifold to cause variations in the opening through the valvular means. As a consequence a relatively constant vacuum is created irrespective of the variations in suction through the intake manifold as caused by opening or closing of the throttle, and the arrangement as thus described will prevent an excess discharge of air into the intake manifold through the conduit leading to the various oil reservoirs when the engine is throttled down, and when such a discharge of air would affect the operation of the engine through the excessive dilution of the combustible mixture by said air.

The invention will be readily understood from the following description of the accompanying drawings, in which:

Figure 1 is a side elevation showing the frame of an automobile having the improved lubricating system employed in connection therewith.

Figs. 2 and 3 are details on the lines 2—2 and 3—3 of Fig. 1.

Fig. 4 is a detail section on the line 4—4 of Fig. 3.

The improved lubricating system may be employed in connection with any usual automobile construction including engine 1 having intake manifold 2 and crank case 3. The usual transmission casing is shown at 4, and the drive shaft $5^a$ extends to the rear axle 5 carrying wheels 6.

In the present embodiment of the invention, we have illustrated the lubricating system as employed in connection with the lubricant in the crank case 3, the lubricant in transmission case 4, and the lubricant in rear axle housing 5. It will be obvious, however, that the system may be employed equally as well in connection with any other, or all reservoirs for lubricating oil upon an automobile.

The improved lubricating system includes tubular receptacles 7, connected to the various containers for the lubricant as by providing upper and lower connecting nipples 8 and 9 upon the tubes. A baffle 10 is preferably arranged in tube 7 so as to direct any oil flowing upwardly through tube 7, by the suction created therein, away from the discharge nipple 11 provided at the upper end of the tube, and toward the upper nipple 8 of the tube which communicates with the receptacle for the lubricant. Conduits 12 are connected to the nipples 11 of the various elements of the lubricating system, and said conduits at their opposite ends are connected to a nipple 13 upon the header 14 which is secured to intake manifold 2 as by threading the header into the manifold pipe.

A sleeve valve 15 is arranged within the header and is provided with a relatively small port 16 and a relatively large port 17 circumferentially beyond the same. The valve is provided with a rod 18 for rotating the same, and said rod extends within the intake manifold of the engine and is provided with an axial conduit $18^a$ communicating with the intake manifold and with the interior of the sleeve valve. An abutment element 19 is arranged upon rod 18 within the intake manifold, and said abutment element is preferably weighted as shown at 20 so as to swing downwardly when the engine is running at comparatively low speeds, and swung upwardly by the suction, through the intake manifold when the engine is running at relatively high speeds.

The sleeve valve will be oscillated through the rotation of rod 18 as thus caused by the swinging of abutment element 19, and said oscillations of the sleeve valve will cause either port 16 or port 17 to aline with nipple 13. The swinging movement of the sleeve valve may be limited by a pin 22 received within a recess 23 provided in said sleeve valve.

The construction, as thus described, causes a relatively small opening through header 14 and by way of port 16 when the engine is running at low speeds, and a relatively large opening through said header by way of port 17 when the speed of the engine is increased so as to swing abutment element 19.

This adjustment of the opening in the conduit leading from the intake manifold to the various oil reservoirs where a vacuum is to be created, will cause a relatively uniform vacuum to be automatically maintained irrespective of the variations in suction through the intake manifold, and it will also be noted that the closing of the opening in said conduit, when the engine is throttled down, will prevent excessive discharge of air to the intake manifold. The possibility of diluting the combustible mixture passing through intake manifold 2 to such an extent as to impair the operation of the engine, is thus prevented.

The improved apparatus thus provides means for creating vacuums in the various lubricating oil reservoirs by the suction through the intake manifold of the engine, and the creation of such vacuums will hold the oil against leakage from the reservoirs.

In the case of the vacuum creating means employed in connection with crank case 3, it will be noted that the vacuum created above the pistons of the engine at the suction strokes will be balanced by the vacuum created in the crank case, as previously described, and that as a consequence there will be no tendency of the oil in the crank case to flow past the pistons of the engine.

While we have illustrated and described the improved lubricating system as employed in connection with an automobile and having the vacuum creating means actuated by the suction through the intake manifold of the engine, it will be apparent that such a lubricating system may be employed in connection with various machinery, and that the necessary vacuum may be created at the reservoirs for a lubricant, by any suitable suction creating means.

Various changes may be made without departing from the spirit of the invention as claimed.

What is claimed is:

1. The combination with a motor vehicle having a crank case, a transmission case and a differential gear case, of tubular receptacles connected to the crank case, the transmission case, and the differential gear case at points above the oil levels, baffles in the tubular receptacles, conduits connected to the upper ends of the tubular receptacles, a header connected to the intake manifold of the engine and to the opposite ends of the conduits from the tubular receptacles, a sleeve valve in the header, a tubular stem extending from the sleeve valve into the intake manifold, and a swinging abutment upon the inner end of the tubular stem in the passage of the intake manifold.

2. In a motor vehicle having a crank case, a transmission case and a differential gear case, of conduits connected to the cases above the oil levels and connected to the intake manifold, a valve for controlling the suction through the conduits to the intake manifold and having a stem extending into the intake manifold, and a swinging abutment upon the stem in the manifold for operating the valve by the suction of the engine.

In testimony whereof we have signed our names to this specification.

FRANK W. THOMAS.
MAYO D. KIMBALL.